(12) United States Patent
Zhang et al.

(10) Patent No.: US 8,903,668 B2
(45) Date of Patent: Dec. 2, 2014

(54) ALTERNATOR SPEED ESTIMATION USING SPECTRUM ANALYSIS

(75) Inventors: Yilu Zhang, Northville, MI (US); Siwei Cheng, Atlanta, GA (US); Mutasim A. Salman, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 629 days.

(21) Appl. No.: 13/083,841

(22) Filed: Apr. 11, 2011

(65) Prior Publication Data

US 2012/0259570 A1 Oct. 11, 2012

(51) Int. Cl.
| | |
|---|---|
| *G01P 3/42* | (2006.01) |
| *G01R 25/00* | (2006.01) |
| *G01R 27/00* | (2006.01) |
| *H02J 7/14* | (2006.01) |
| *B60W 10/08* | (2006.01) |

(52) U.S. Cl.
CPC .............. *H02J 7/1415* (2013.01); *B60W 10/08* (2013.01); *B60Y 2400/3086* (2013.01); *B60Y 2400/303* (2013.01)
USPC ............................................ 702/65; 324/160

(58) Field of Classification Search
USPC ............................................ 702/65; 324/160
See application file for complete search history.

(56) References Cited

U.S. PATENT DOCUMENTS 5,640,086 A * 6/1997 Rentsch et al. ............... 324/166
2011/0000421 A1 1/2011 Zhang

FOREIGN PATENT DOCUMENTS

| | | |
|---|---|---|
| DE | 44 40 999 A1 | 5/1995 |
| DE | 199 59 939 A1 | 6/2001 |
| EP | 0 780 689 A1 | 6/1997 |

OTHER PUBLICATIONS

Course Syllabus as of 12:32 PM on Tuesday, Dec. 28, 2010. ece2610_chap7 Syllabus: ECE 2610, Fall 2009 School: UCCS ece2610_chap7 , p. 20.*
Bologna Linda et al., "Hierarchical Diagnosis Strategy For An Automotive Electrical Power Generation System", DSCC2008-12345 10/08 2008 ASME Ann Arbor, MI pp. 1-8.
Kamwa Innocent et al., "Sensorless ANN-Based Speed Estimation of Synchronous Generators: Improved Performance through Physically Motivated Pre-Filters",0-7803-9490/06 Jul. 2006 IEEE pp. 1710-1718.
Feng, Hua-Jun et al. "Design of digital trap by Z-transform and pole-zero plot" Journal of Zhejiang Normal University (Natural Sciences) Jan. 2004.

* cited by examiner

*Primary Examiner* — John Breene
*Assistant Examiner* — Manuel Rivera Vargas
(74) *Attorney, Agent, or Firm* — John A. Miller; Miller IP Group, PLC

(57) ABSTRACT

A system and method for determining the speed of an alternator, for example, a vehicle alternator. The method includes measuring the current or voltage of a vehicle battery for a predetermined period of time, and then notch filtering the measured current or voltage signal to remove known harmonics. A limited data point Fast Fourier Transform (FFT) spectrum analysis operation is performed to identify the frequency peaks in the filtered signal, where the highest peak represents a ripple current on the DC alternator signal. The highest peak in the FFT signal is identified, and an interpolation process is performed between that peak and an adjacent peak in the data to identify the actual frequency of the ripple current. The ripple current is then converted to the speed of the alternator.

15 Claims, 4 Drawing Sheets ically include an alternator that provides electrical power to recharge a vehicle battery and operate the vehicle electrical systems when the vehicle is running. The alternator includes a pulley that engages a flexible belt driven by the vehicle engine, where the belt also drives other vehicle components, such as a power steering pump, an air compressor, etc. As the belt rotates the alternator pulley, the pulley rotates a rotor within a stator of the alternator, where the rotor typically has a permanent magnet and the stator includes one or more wound coils. A typical vehicle alternator will include three stator windings that are 90° out-of-phase with each other that generate three AC signals that are sent to a three-phase diode bridge rectifier to convert the AC signals to a DC signal suitable for recharging the battery. The alternator will also include a voltage regulator that regulates the DC signal. The diode bridge rectifier generates an AC ripple signal on the DC signal as a factor of the conversion. Various filtering techniques and other operations can be performed to reduce the ripple current generated by the rectifier conversion, but there still will be some level of AC ripple on the DC signal that can be detected.

It is desirable during vehicle operation to know the rotational speed of the alternator for various reasons, such as determining whether the belt driving the alternator pulley is slipping. If the belt is not slipping, then the alternator speed is the engine speed times the ratio of the alternator pulley. Therefore, by knowing the alternator speed, the pulley ratio and the engine speed, it can be determined whether the belt is slipping. Further, by knowing the alternator speed, damage to the belt or even the alternator itself can be determined if that rotational speed is not smooth.

SUMMARY OF THE INVENTION

In accordance with the teachings of the present invention, a system and method are disclosed for determining the speed of an alternator, for example, a vehicle alternator. The method includes measuring the current or voltage of a vehicle battery for a predetermined period of time, and then notch filtering the measured current or voltage signal to remove known harmonics. A limited data point Fast Fourier Transform (FFT) spectrum analysis operation is performed to identify the frequency peaks in the filtered signal, where the highest peak represents a ripple current on the DC alternator signal. The highest peak in the FFT signal is identified, and an interpolation process is performed between that peak and an adjacent peak in the data to identify the actual frequency of the ripple current. The ripple current is then converted to the speed of the alternator.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for determining the speed of an alternator using spectrum analysis is merely exemplary in nature, and is in no way intended to limit the invention or its applications or uses. For example, the present invention has particular application for determining the speed of a vehicle alternator. However, as will be appreciated by those skilled in the art, the system and method described herein for determining the speed of an alternator will have application for other alternators other than vehicle alternators.

Figure 1:
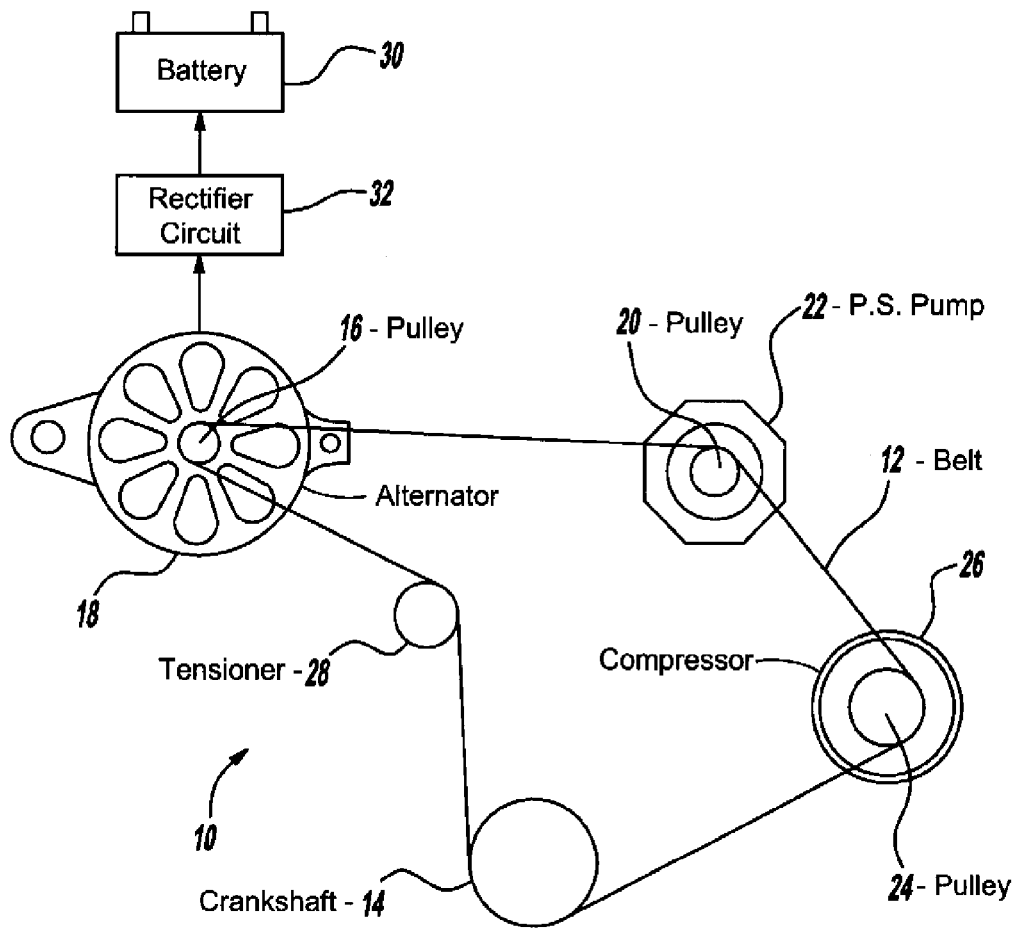
FIG. 1 is a representation of a vehicle alternator and belt system.

FIG. 1 is a schematic type diagram of a vehicle front end accessory drive system 10 including a drive belt 12. The system 10 includes an engine crank shaft 14 that is rotated by the vehicle engine and provides rotational energy for driving the drive belt 12 in a manner that is well understood by those skilled in the art. The drive belt 12 engages a pulley 16 of an alternator 18, and provides the rotational energy for turning the rotor (not shown) within the alternator 18 to generate electrical energy in the manner discussed above and well known to those skilled in the art. The drive belt 12 also engages a pulley 20 of a power steering pump 22 and a pulley 24 of an air compressor 26 to provide rotational energy to operate those devices. A belt tensioner 28 provides the proper tension on the drive belt 12 so that the belt 12 does not easily slip on the crank shaft 14 or the pulleys 16, 20 and 24. The electrical energy generated by the alternator 18 provides power to drive various vehicle electrical systems and charge a vehicle battery 30.

The AC signal generated by the alternator 18 is provided to a rectifier circuit 32 that typically employs a three-phase diode bridge to convert the AC signal to a DC signal suitable to charge the battery 30. A three-phase machine of this type generally requires six diodes and six switches, typically MOSFET switches, that switch the diodes depending on which stator winding is generating current so that the diodes direct the current in the same direction. A switch control circuit (not shown) activates the switches in synchronization with the three-phase current flow to cause the diodes to conduct and provide the rectification in a manner that is well understood by those skilled in the art. As discussed above, this AC-to-DC conversion generates a ripple current signal on the DC signal that can be detected.

The present invention proposes a system and method for determining the rotational speed of the alternator 18 by detecting the ripple current using spectrum analysis, which can then be used for various purposes, including determining whether the belt 12 is slipping on the pulley 16. As will be discussed in detail below, the method includes measuring the current or voltage of the vehicle battery 30 that receives the DC charging signal from the alternator 18, filtering the current or voltage signal, providing FFT spectrum analysis on the filtered signal, and identifying a peak in the spectrum signal associated with the ripple current. Once the frequency of the ripple current is identified, it can be used to determine the rotational speed of the alternator 18 by known methods.

Figure 2:
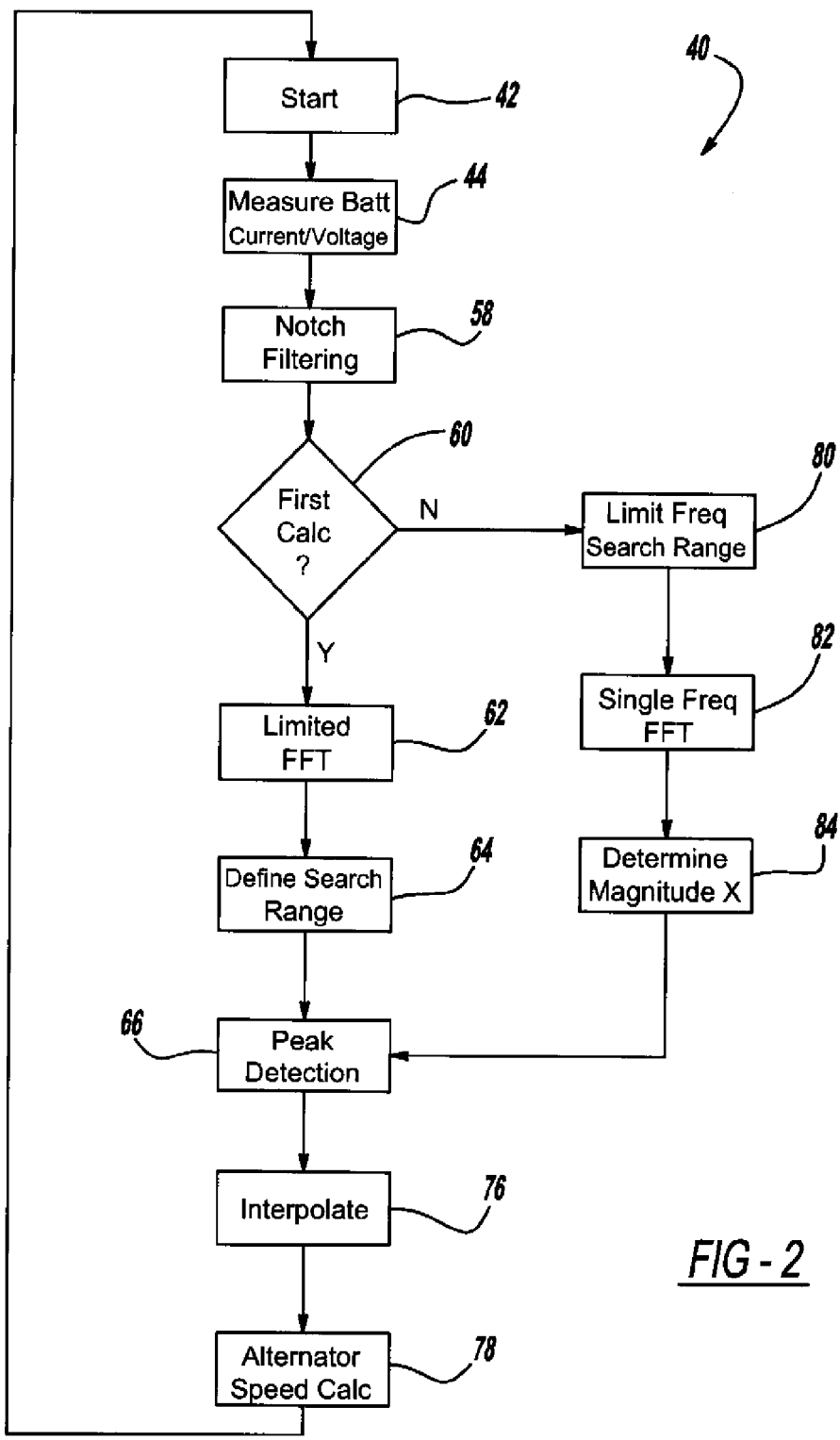
FIG. 2 is a flow chart diagram showing a process for determining alternator speed using spectrum analysis.

FIG. 2 is a flow chart diagram 40 showing a process for determining the speed of the alternator 18 by determining the frequency of the ripple current on the DC signal that charges the battery 30 using spectrum analysis. The algorithm for determining the alternator speed is initiated at box 42. The ripple current can be obtained by first knowing the voltage or current of the DC signal output from the rectifier circuit 32, but vehicles typically do not employ sensors on the alternator 18 to provide those measurements. However, there are existing sensors on modern vehicles that measure battery current and voltage, and this voltage and current has the same signature as the rectified alternator voltage and current. Therefore, the present invention determines the current or voltage of the battery 30 using available sensors at box 44. In one embodiment, the battery current or voltage measurements over a certain time period are used for each speed calculation, such as 50 ms.

Figure 3:
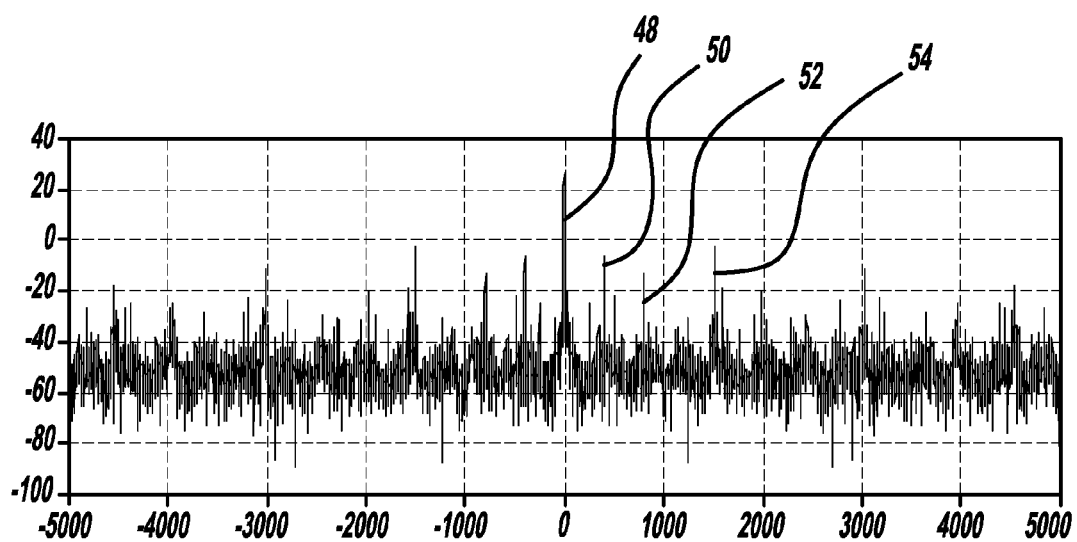
FIG. 3 is a graph with frequency on the horizontal axis and magnitude on the vertical axis showing an exemplary frequency spectrum of a measured battery current or voltage without filtering.

It is known that a current or voltage signal can be analyzed by a Fast Fourier Transform (FFT) operation that decomposes the signal into its constituent frequencies to identify a frequency spectrum of the signal. FIG. 3 is a graph with frequency on the horizontal axis and magnitude on the vertical axis showing an example of a complete or full power spectrum of the measured current or voltage from the battery 30 determined by an FFT process. A peak 48 at zero frequency represents the DC signal, a harmonic peak 50 is a field duty cycle of the armature or rotor in the alternator 18 at about 400 Hz and a second harmonic peak 52 of the field duty cycle is shown at about 800 Hz, which are all known. A peak 54 at about 1500 Hz is the frequency of the ripple current, which is variable.

Because the frequency of the peaks 48, 50 and 52 are known, the measured battery current or voltage signal can be filtered by a notch filter, which filters all of the frequencies between predetermined upper and lower limits, to remove those frequency peaks to isolate the peak 54 that is being determined. The notch filtering is performed at box 58 on the measured battery current or voltage signal for each known frequency that is to be removed. Equation (1) below gives an example of a suitable digital notch filter for this purpose.

$$H(z) = \frac{(1-e^{j\omega_0}z^{-1})(1-e^{-j\omega_0}z^{-1})}{(1-re^{j\omega_0}z^{-1})(1-re^{-j\omega_0}z^{-1})} = \frac{1-2\cos\omega_0 z^{-2}+z^{-2}}{1-2r\cos\omega_0 z^{-1}+r^2 z^{-2}} \quad (1)$$

Where H is the z-transform of the filter, $\omega_0$ is the frequency that is being rejected and r sets the frequency width of the notch, where the closer r is to 1, the sharper the notch.

Figure 4:
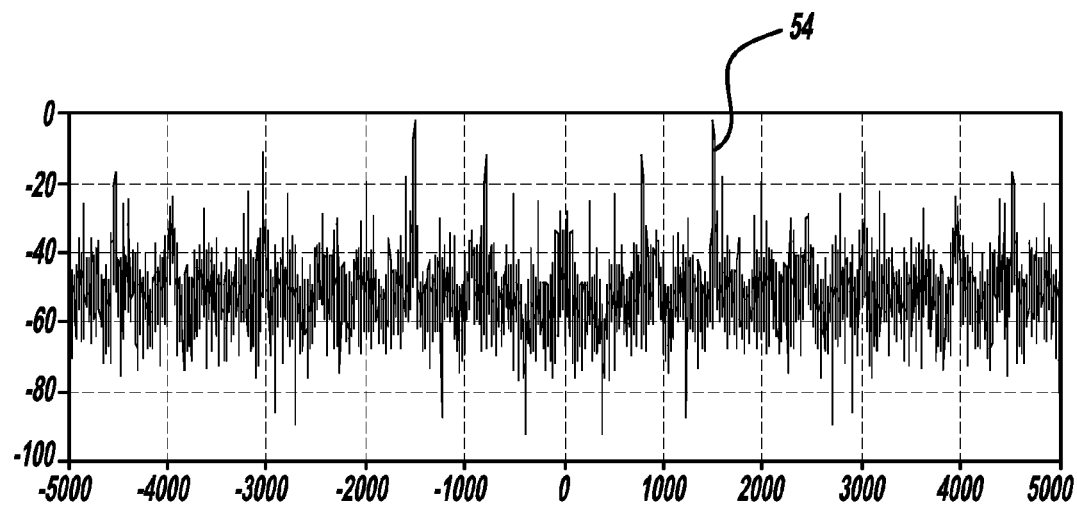
FIG. 4 is a graph with frequency on the horizontal axis and magnitude on the vertical axis showing the frequency spectrum in FIG. 2 with notch filtering.

The frequency spectrum signal from the graph in FIG. 3 that has been notch filtered prior to the FFT operation is shown in FIG. 4 where the peaks 48, 50 and 52 associated with the DC signal and the known harmonics have been removed. In this representation, the highest frequency peak should then be the ripple current frequency peak 54, which is at about 1500 Hz.

The algorithm then determines whether this is the first calculation for determining the alternator speed after vehicle ignition or after some action that causes the vehicle to lose track of the alternator speed at decision diamond 60 for reasons that will become apparent from the discussion below.

The processing required to perform the FFT operation to get the power spectrum signals shown in FIGS. 3 and 4 is significant and complex, and generally beyond the reasonable computing capacity of an electronic control unit (ECU) on a vehicle. Therefore, instead of providing a complete FFT spectrum analysis on the filtered battery current or voltage signal, the present invention proposes performing a limited FFT operation, at box 62, using a limited number of data points or bins to reduce the sample size and the complexity of the operation. In this non-limiting embodiment, the FFT operation including windowing to reduce spectrum leakage, such as Hanning windowing, well understood by those skilled in the art, using 256 data points. By reducing the number of spectrum analyzed data points to 256, the frequency resolution of the spectrum signal is about 39 Hz between data bins.

The algorithm then defines a search range at box 64 within the filtered and data point limited frequency spectrum signal that the algorithm will specifically look at to identify the highest peak, which represents the ripple current frequency. In this embodiment, a pre-frequency ripple current is identified, which can be the estimated ripple current frequency from the previous sample period or a frequency that the ripple current is expected to be. The algorithm adds and subtracts a certain frequency, such as 250 Hz, to and from the pre-frequency to identify a search range of about 500 Hz. Once the search range is identified for determining the ripple current peak, a peak detection process is performed at box 66 to identify the highest peak within that range.

Figure 5:
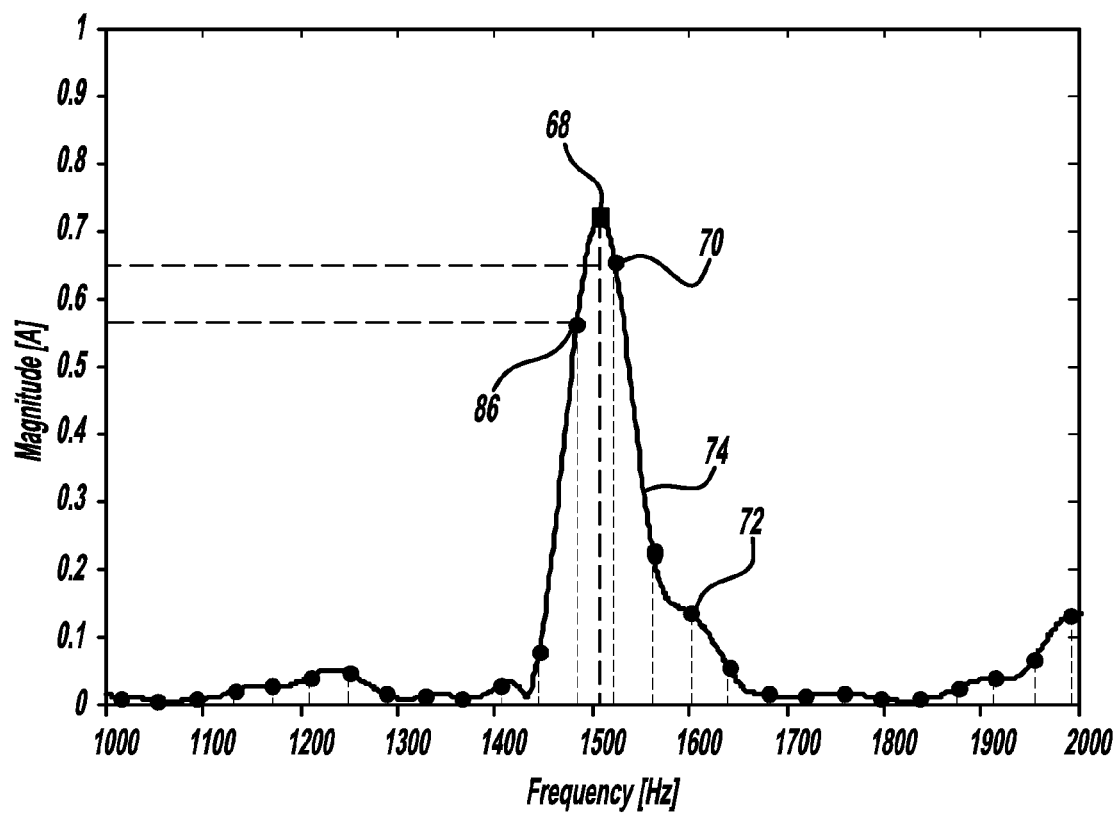
FIG. 5 is a graph with frequency on the horizontal axis and magnitude on the vertical axis of a portion of a filtered FFT signal within a predetermined peak search range.

FIG. 5 is a graph with frequency on the horizontal axis and magnitude on the vertical axis showing data points 72 from the low FFT resolution analysis for the frequencies in the search range of 1300-1800 Hz. Graph line 74 represents the smooth frequency spectrum of the FFT analysis that would have resulted from a full spectrum analysis.

Because the frequency resolution of the FFT spectrum signal between the data points is 39 Hz, it is desirable to refine the peak localization to specifically identify the actual ripple current frequency because a resolution of 39 Hz represents a difference in the rotational speed of the alternator 18 of about 65 RPMs. In other words, the peak identified by the peak detection process from the available data points in the limited spectrum analysis is unlikely to be the actual ripple current frequency because of the distance between the data points in the frequency spectrum, and could possibly be as much as 39 Hz away from the actual ripple current frequency.

In the graph shown in FIG. 5, the identified highest peak of the data points 72 would be data point 70, but the actual ripple current frequency is at point 68. The present invention proposes an interpolation process at box 76 to refine the peak localization between the data point 70 and a next highest adjacent data point 86 to identify the actual ripple current at the peak identified by the point 68. Consider Δt is the time interval between data samples, N is the number of data points in FFT. The frequency interval between the spectral bins in the current spectrum is:

$$f_0 = \frac{1}{N\Delta t} \quad (1)$$

Where Δt is the time interval between data samples and N is the number of data points in the FFT.

The peak frequency f at the point 68 can be determined as:

$$f=(i+\delta)f_0=\lambda f_0 \quad (2)$$

Where δ is:

$$\delta = \frac{2\alpha - 1}{\alpha + 1} \quad (3)$$

Where α is:

$$\alpha = \frac{|X(i+1)|}{|X(i)|} \quad (4)$$

Where X is the magnitude of the FFT data points, i is the location of the data point 86 and i+1 is the location of the data point 70.

Once the ripple frequency f is identified by the interpolation process, the algorithm calculates the alternator speed at box 78 in RPMs for a three winding stator as the ripple frequency f divided by the number of pole pairs in the alternator 18 divided by the number of diodes in the rectifier circuit 32 and times 60 seconds, i.e., f/# pole pairs/# of diodes*/60. The algorithm then returns to the start box 42 to again calculate the alternate speed for the next sample time of the battery voltage or current measurements.

If the algorithm determines that it is not right after vehicle ignition and previous alternator speed calculations have been made and are available at the decision diamond 60, the algorithm performs an even more reduced complexity FFT analysis, which will still give an accurate ripple current identification based on the previous alternator speed calculations. Particularly, at box 80, the algorithm limits the frequency peak search range to a few of the frequency data bins, such as five, around the last detected ripple current frequency peak. In other words, instead of the peak detection using the several data points 72 shown in FIG. 5 for the first calculation of the alternator speed, the algorithm will search for the peak frequency point using only five of the data points around the point 68. This gives a search range of about 1450-1600 Hz range. The algorithm performs a single-frequency FFT spectral operation, sometimes known as a Goertzel algorithm, for each of the five data bins in the reduced frequency range, at box 82, to identify the new frequencies for the data bins around the last determined ripple current frequency.

The magnitude X of each of the data points within the data bins for the reduced frequency range is then determined at box 84 as:

$$s(n)=I(n)+2\cos(2\pi\omega)s(n-1)-s(n-2) \quad (5)$$

$$X(n)=s(n)-e^{-2\pi j\omega}s(n-1) \quad (6)$$

Where s(n) is an intermediate variable, I(n) is the current measurement, ω is the frequency of the particular selected data bin for the new calculation, X(n) is the amplitude of the frequency at the bin, n=t, t−1, . . . , t−255, and j is sqrt(−1).

Once each new frequency magnitude X(n) has been obtained for each of the five data bins, the algorithm returns to the box 66 to perform the peak detection for those magnitudes to identify the highest peak. The interpolation process is then again performed to identify the actual ripple current frequency at the box 76 and the rotational speed of the alternator 18 is calculated at the box 78.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for determining a speed of an alternator, said method comprising:
    determining an output current or voltage signal of the alternator, where the output current or voltage signal includes a ripple current frequency as a result of an AC-to-DC conversion;
    filtering the current or voltage signal to remove known harmonic frequencies;
    performing a Fast Fourier Transform (FFT) operation to identify a frequency spectrum signal of the filtered current or voltage signal, including performing an FFT operation having a limited number of data points;
    identifying a peak detection search range within the frequency spectrum signal within which the ripple current frequency is known to exist;
    determining if a previous ripple current frequency determination has been made and if so identifying a peak detection search range includes identifying the search range as a predetermined limited number of data points around that ripple current frequency;
    identifying a highest peak frequency within the search range as the ripple current frequency; and
    converting the highest peak frequency to the alternator speed.

2. The method according to claim 1 wherein filtering the current or voltage signal includes using a digital notch filter.

3. The method according to claim 2 wherein the digital notch filter uses the equation:

$$H(z) = \frac{(1-e^{j\omega_0}z^{-1})(1-e^{-j\omega_0}z^{-1})}{(1-re^{j\omega_0}z^{-1})(1-re^{-j\omega_0}z^{-1})} = \frac{1-2\cos\omega_0 z^{-2}+z^{-2}}{1-2r\cos\omega_0 z^{-1}+r^2 z^{-2}}$$

where H is the z-transform of the filter, $\omega_0$ is the frequency that is being rejected and r sets a frequency width of the notch.

4. The method according to claim 1 wherein the alternator is a vehicle alternator.

5. The method according to claim 4 wherein determining an output current or voltage signal of the alternator includes measuring a battery current or voltage of a vehicle battery that is being charged by the alternator.

6. The method according to claim 1 wherein identifying a peak detection search range includes identifying the ripple current frequency from a previous ripple current frequency determination and adding and subtracting a predetermined frequency value to the previous ripple current frequency to identify the search range.

7. The method according to claim 1 wherein the limited number of data points is 256 data points providing a frequency resolution of about 39 Hz.

8. The method according to claim 1 wherein identifying a highest peak frequency within the search range includes identifying a highest peak frequency based on the limited number of data points and then interpolating between that data point and an adjacent data point to identify an actual highest peak frequency.

9. The method according to claim 1 further comprising performing a single-frequency FFT operation for each data point instead of the limited FFT operation having the limited number of data points.

10. The method according to claim 1 wherein performing the single-frequency FFT operation for each data point includes using the following equations:

$$s(n)=I(n)+2\cos(2\pi\omega)s(n-1)-s(n-2)$$

$$X(n)=s(n)-e^{-2\pi j\omega}s(n-1)$$

where s(n) is an intermediate variable, I(n) is the current measurement, ω is the frequency of the particular data bin for the last calculation and X(n) is a frequency FFT amplitude, n=t, t−1, . . . , t−255, and j is sqrt(−1).

11. A method for determining a speed of a vehicle alternator, said method comprising:
  measuring a current or voltage of a vehicle battery, where the current or voltage includes a ripple current frequency produced as a result of an AC-to-DC conversion in the alternator;
  filtering the current or voltage measurement signal to remove known harmonics using a digital notch filter;
  performing a Fast Fourier Transform (FFT) operation having a limited number of data points to identify a frequency spectrum signal of the filtered current or voltage measurement signal;
  identifying a peak detection search range within the frequency spectrum signal within which the ripple current frequency is known to exist that includes adding and subtracting a predetermined value to a previous ripple current frequency to identify the search range;
  determining if a previous ripple current frequency determination has been made and, if so, identifying a peak detection search range includes identifying the search range as a predetermined limited number of data points around that ripple current frequency;
  identifying a highest peak frequency within the search range and interpolating between the highest peak frequency and an adjacent frequency to identify the ripple current frequency; and
  converting the ripple current frequency to the alternator speed.

12. The method according to claim 11 wherein the limited number of data points is 256 data points providing a frequency resolution of about 39 Hz.

13. The method according to claim 11 further comprising performing a single-frequency FFT operation for each data point instead of the FFT operation having the limited number of data points.

14. A system for determining a speed of an alternator, said system comprising:
  means for determining an output current or voltage signal of the alternator, where the output current or voltage signal includes a ripple current frequency as a result of an AC-to-DC conversion;
  means for filtering the current or voltage signal to remove known harmonic frequencies;
  means for performing a Fast Fourier Transform (FFT) operation to identify a frequency spectrum signal of the filtered current or voltage signal, where the means for performing the FFT operation performs the FFT operation with a limited number of data points;
  means for identifying a peak detection search range within the frequency spectrum signal within which the ripple current frequency is known to exist;
  means for determining if a previous ripple current frequency determination has been made and if so the means for identifying a peak detection search range identifies the search range as a predetermined limited number of data points around that ripple current frequency, and means for performing a single-frequency FFT operation for each data point instead of the FFT operation having a limited number of data points;
  means for identifying a highest peak frequency within the search range as the ripple current frequency; and
  means for converting the highest peak frequency to the alternator speed.

15. The system according to claim 14 wherein the means for identifying a highest peak frequency within the search range identifies a highest peak frequency based on the limited number of data points and then interpolates between that data point and an adjacent data point to identify an actual highest peak frequency.

* * * * *